Patented June 15, 1948

2,443,211

UNITED STATES PATENT OFFICE 2,443,211

METHOD OF MAKING TITANATE DIELECTRIC CERAMIC

Eugene Wainer and Allen N. Salomon, Niagara Falls, N. Y., assignors to The Titanium Alloy Manufacturing Company, New York, N. Y., a corporation of Maine No Drawing. Application May 19, 1943, Serial No. 487,644

1 Claim. (Cl. 106—39)

The present invention relates to a method of manufacturing ceramic material of high specific inductive capacity and more particularly to the manufacture of ceramic materials of this type from titanium dioxide and certain alkaline earth metal compounds.

In co-pending applications for patent, namely Serial No. 465,387, filed November 12, 1942, and Serial No. 482,613, filed April 10, 1943, now Patent No. 2,420,692, May 20, 1947, high dielectric materials comprising titanates of certain of the alkaline earth metals have been described. Such ceramics were made by firing commercially prepared titanates and in the case of the fired mixtures of barium titanate and strontium titanate a peak dielectric constant was obtained in that series of about 4000 when measured at one megacycle. In accordance with the present invention much higher specific inductive capacities can be obtained by preparing a ceramic body from titanium dioxide and oxides of the alkaline earth metal or from salts readily transformed into the oxides, rather than by mixing and firing the specific titanates. This unexpected result is obtained even though the same oxide relationship is maintained. That is to say, the specific inductive capacity of a material of a given composition will be higher in those instances where the composition is made by mixing the oxides of the alkaline earth metals with titanium dioxide and firing, rather than by firing a mixture of the titanates of the same alkaline earth metals.

This surprising difference in the specific inductive capacity may well be accounted for on a theory based on the atomic structure of these ceramic compositions in crystalline form. Thus, it has been determined that the very high dielectric constants of materials of this general nature are quite evidently due to the particular atomic structure shown by these compounds wherein the alkaline earth metal, titanium, and oxygen exist as ions in the crystalline structure. The ionic structure coupled with very rigid spatial relationships and ionic radii of the individual ions are sufficient to account for the high specific inductive capacity values when the nature of each item in the molecule is considered. Based on this theory, therefore, it may be shown that the type of contact between the reacting particles is much more favorable toward the development of the desired structure and spatial relationships in those cases where all of the raw material is mixed together and fired rather than where the alkaline earth titanates are mixed and fired to yield the final bodies. Thus, where the ceramic body is made from alkaline earth titanates, as for instance, barium titanate and strontium titanate, contact can occur only between barium titanate and strontium titanate while in those cases where the raw material is mixed initially there may be barium oxide-strontium oxide contact as well as alkaline earth metal oxide-titanium dioxide contact.

As a specific illustration of the present invention, titanium dioxide was mixed as intimately as possible with the carbonates of barium and of strontium and the mixture fired at an elevated temperature until reaction occurred. Mixture of the materials may be made either in solution or dry. In the first instance the compounds are precipitated together, the precipitate removed, dried and fired. In the second instance the ingredients are mixed by ball milling with water until comminution is complete, that is to say until the particle size of the reactants is 0.3 microns or less, a size which should be reached in order to obtain substantially complete reaction of the dry mixed materials.

After grinding to the desired degree of fineness the slip was dried and then fired, the degree of firing depending upon the ultimate use of the material, complete reaction in any case being obtained by firing for about four hours at 2200° F. to 2250° F. Where the ultimate use of the finished material is a ceramic body, firing is continued until the reacted particles have grown to a particle size range of 0.5 to 0.7 micron, usually necessitating a firing period of 6 to 7 hours at 2250° F. In the case when the ultimate use is as a high electrical capacity filler in a resin, low melting glass, wax or similar bonding agent, the optimum particle size is 1.0 to 1.5 microns requiring a firing period of 8 to 10 hours at 2300° F.

The fired $BaO$—$SrO$—$TiO_2$ composition was ground and disintegrated and pressed into suitably sized discs in accordance with usual ceramic procedures. If desired a small amount of conventional bonding agent, such as polyvinyl alcohol, may be added. After drying the pieces were fired to 2400° F. and maintained at this temperature for at least four hours so as to permit complete vitrification. On cooling, silver paste was brushed on the appropriate surfaces and then fired to a metallic finish. The electrical properties were obtained on pieces of this nature.

| Composition No. | Compositions A | | Dielectric Constant 1 mega. | Compositions B | | | Dielectric Constant 1 mega. |
|---|---|---|---|---|---|---|---|
| | BaTiO₃ | SrTiO₃ | | BaCO₃ | SrCO₃ | TiO₂ | |
| 1 | 65.0 | 35.0 | 2,160 | 128.5 | 51.7 | 80.0 | 5,250 |
| 2 | 67.0 | 33.0 | 2,900 | 132.2 | 48.7 | 80.0 | 6,080 |
| 3 | 69.0 | 31.0 | 3,640 | 136.2 | 46.7 | 80.0 | 7,340 |
| 4 | 70.0 | 30.0 | 3,770 | 138.2 | 44.3 | 80.0 | 8,740 |
| 5 | 71.0 | 29.0 | 4,310 | 140.2 | 42.8 | 80.0 | 9,550 |
| 6 | 72.0 | 28.0 | 4,750 | 142.2 | 41.4 | 80.0 | 7,360 |
| 7 | 73.0 | 27.0 | 4,860 | 144.2 | 39.8 | 80.0 | 5,850 |
| 8 | 74.0 | 26.0 | 4,680 | 146.2 | 38.4 | 80.0 | 4,480 |
| 9 | 75.0 | 25.0 | 4,490 | 148.2 | 36.9 | 80.0 | 3,770 |

Examples of the results of our method of practice are illustrated in the above table. Compositions A were prepared from mixtures of prefired titanates; compositions B have exactly the same ultimate BaO—SrO—TiO₂ relationship as the corresponding A composition except that the raw ingredients were mixed completely before firing. All of these compositions in finished ceramic form were fired four hours at 2400° F. at the same time, and under the same conditions in the same furnace.

It will be understood that the above example is illustrative only of the invention and is not to be deemed limitative thereof since the scope of the invention is defined by the appended claim.

What is claimed is:

A method of preparing a ceramic material comprising ceramically reacting at elevated temperature a mixture which substantially consists of strontium oxide, barium oxide and titanium oxide whereby a mixed alkaline earth titanate ceramic material is produced corresponding to the range 27%–35% strontium titanate and 73%–65% barium titanate, the dielectric constant of which exceeds that of a chemically similar material prepared by direct ceramic combination of the corresponding titanates.

EUGENE WAINER.
ALLEN N. SALOMON.

REFERENCES CITED

The following references are of record in the file of this patent:

UNITED STATES PATENTS

| Number | Name | Date |
|---|---|---|
| 2,071,452 | Bloch | Feb. 23, 1937 |
| 2,098,812 | Pulfrich | Nov. 9, 1937 |
| 2,115,666 | Dorn | Apr. 26, 1938 |
| 2,165,819 | Albers-Schonberg | July 11, 1939 |
| 2,220,765 | Hirose et al. | Nov. 5, 1940 |
| 2,277,733 | Wainer et al. | Mar. 31, 1942 |
| 2,277,734 | Wainer et al. | Mar. 31, 1942 |
| 2,305,327 | Thurnauer | Dec. 15, 1942 |
| 2,328,410 | Berge | Aug. 31, 1943 |

FOREIGN PATENTS

| Number | Country | Date |
|---|---|---|
| 94,309 | Sweden | 1939 |
| 445,495 | Great Britain | 1936 |
| 453,707 | Great Britain | 1936 |
| 488,877 | Great Britain | 1938 |
| 505,165 | Great Britain | 1939 |